United States Patent [19]

Harvey

[11] Patent Number: 4,592,559
[45] Date of Patent: Jun. 3, 1986

[54] PISTON RING SEAL WITH PRESSURE DISTRIBUTION GROOVES

[75] Inventor: Andrew C. Harvey, Waltham, Mass.

[73] Assignee: Foster-Miller, Inc., Waltham, Mass.

[21] Appl. No.: 768,951

[22] Filed: Aug. 23, 1985

[51] Int. Cl.[4] ............................................. F16J 9/12
[52] U.S. Cl. ..................................... 277/214; 277/3;
 277/176; 277/215; 277/216; 277/198
[58] Field of Search .................. 277/3, 214, 215, 216,
 277/157, 173, 176, 192, 198

[56] References Cited

U.S. PATENT DOCUMENTS

| | | | |
|---|---|---|---|
| 775,213 | 11/1904 | Ericsson | 277/214 |
| 1,368,447 | 2/1921 | Megson | 277/214 |
| 1,426,694 | 8/1922 | Weidenfeller | 277/215 X |
| 1,595,855 | 8/1926 | Clark | 277/198 |
| 2,228,495 | 1/1941 | Williams . | |
| 2,670,259 | 2/1954 | Bergeron . | |
| 2,844,422 | 7/1958 | Wankel . | |
| 3,528,667 | 9/1970 | Spaven | 277/157 X |
| 4,289,264 | 9/1981 | Rawlins | 277/27 |

FOREIGN PATENT DOCUMENTS 279622 11/1930 Italy ...................................... 277/214

OTHER PUBLICATIONS

Koppers Piston Ring Handbook, (1975), pp. 1-3, 8-13, 46, 47, 50, 51, 54, 55, 60, 61.

Primary Examiner—Robert S. Ward

[57] ABSTRACT

Seal structure for positioning between two members disposed for sliding relative movement includes a band component that is adapted to be carried by one member and that has a front surface for engagement with the other member and a backup component that is seated in slidable relation on a rear surface of the band component. A seal surface is defined between two pressure distribution regions formed in the front surface of the band component, and the backup component is located in general alignment with the seal surface and provides pressure compensation at the seal interface between the seal surface and the juxtaposed surface of the other member.

15 Claims, 6 Drawing Figures

PISTON RING SEAL WITH PRESSURE DISTRIBUTION GROOVES

This invention relates to seal arrangements, and more particularly to seals for sliding interfaces.

A well-known and effective seal component of reciprocating engines and gas compressors or expanders is the single-split metallic piston ring that has a relatively small rectangular cross-section. However, such seal rings are not adequate in specialized applications where lubrication is marginal or nonexistent, pressure and/or temperature conditions are high, or the fluids being sealed contain abrasive materials. Such a specialized application is an intensifier that operates at 15,000 and handles hot drilling mud (temperatures of 350°–500° F.). Another such application is in an adiabatic diesel. In such applications, conventional ring seals fail rapidly.

In accordance with one aspect of the invention, there is provided seal structure for positioning between two members disposed for sliding relative movement, the seal structure including a band component that is adapted to be carried by one member and that has a front surface for engagement with the other member and a backup component that is seated in slidable relation on a rear surface of the band component. A seal surface is defined between two pressure distribution regions formed in the front surface of the band component, and the backup component is located in general alignment with the seal surface and provides pressure compensation at the seal interface between the seal surface and the juxtaposed surface of the other member.

In preferred embodiments, the two members are of cylindrical configuration and are disposed for axial sliding movement relative to one another, the band and backup components are ring members, the backup component being disposed outside the band component in a plunger seal type embodiment and inside the band component in a piston ring type embodiment. In particular embodiments, the band and backup components are disposed in a recess in one member and a supplemental cavity in the recess positions the backup component in general alignment with the seal surface while allowing the backup component to slide along the rear surface of the band component in a direction generally perpendicular to the disposition of the pressure distribution regions, each pressure distribution region is an essentially continuous groove and the pressure distribution grooves are disposed generally parallel to one another so that a circumferential seal surface is defined between the grooves across which a transition pressure profile exists, and a set of pressure bleed channels extend from the high pressure side and the low pressure side of the band component to the adjacent groove. The low pressure side of the backup component is located between the two grooves and applies pressure to the circumferential seal surface as a function of its axial position. The total area of the front surface of the band component is preferably at least three times the area of the seal surface between the grooves.

The wide band slider—narrower static backup combination allows separation of functions so that, for example, the design and material of the band component can be optimized for conformal sealing and wear life while the backup component can be designed to provide uniform spring load and split gap sealing, independent of band wear. The design flexibility makes the seal system suitable for use in a variety of applications, either with or without lubrication, and particularly in applications where lubrication is reduced, marginal, or nonexistent. The results of wear analysis show that the pressure-balance seal system offers life of from 1,000 to over 10,000 hours in the absence of normal lubrication, the highest range of life probably being in the burnishing regime of wear (and excludes three-body abrasive wear or corrosion). Suitable materials to withstand the effects of contaminants include ceramics that have very high hardness and stability. In a nonlubricated solar-powered engine with steam input at 1300° F., for example, the ring components may be made of carbon; in dry oxygen compressors or Stirling engines, the band component may be of filled organic material; in lubricated high performance internal combustion engines, the band component may be a wide, thin metal member having an ultra-high surface hardness; and in a ceramic cylinder in an adiabatic diesel engine, the band may be a segmented cermet or a true ceramic of substantial thickness with more than one split or joint. The seal arrangement is useful in a variety of sliding interface configurations, and the sliding motion may be axial, rotary, combined or otherwise. Seals in accordance with the invention may be composed of economically manufactured components and provide effective sealing with low contact pressure. In one embodiment, the composite seal is of the "piston ring" type and in another embodiment the composite seal is a plunger shaft seal.

Other features and advantages will be seen as the following description of particular embodiments progresses, in conjunction with the drawings, in which.

DESCRIPTION OF PARTICULAR EMBODIMENTS

Figure 1:
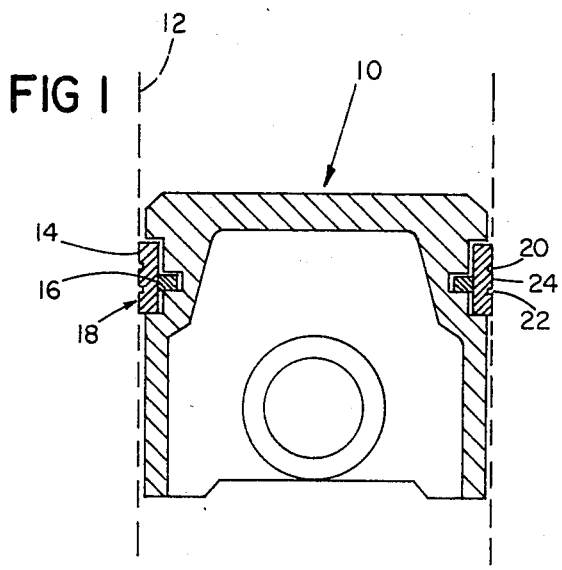
FIG. 1 is a diagrammatic sectional view of a cylinder and piston construction employing seal structure in accordance with the invention.
Figure 2:
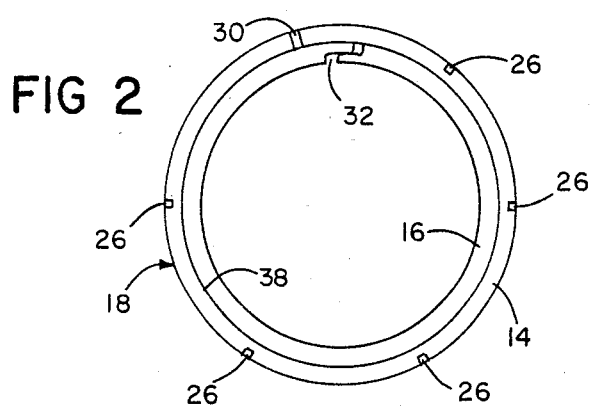
FIG. 2 is a top view of the seal structure employed in the system of FIG. 1.
Figure 4:
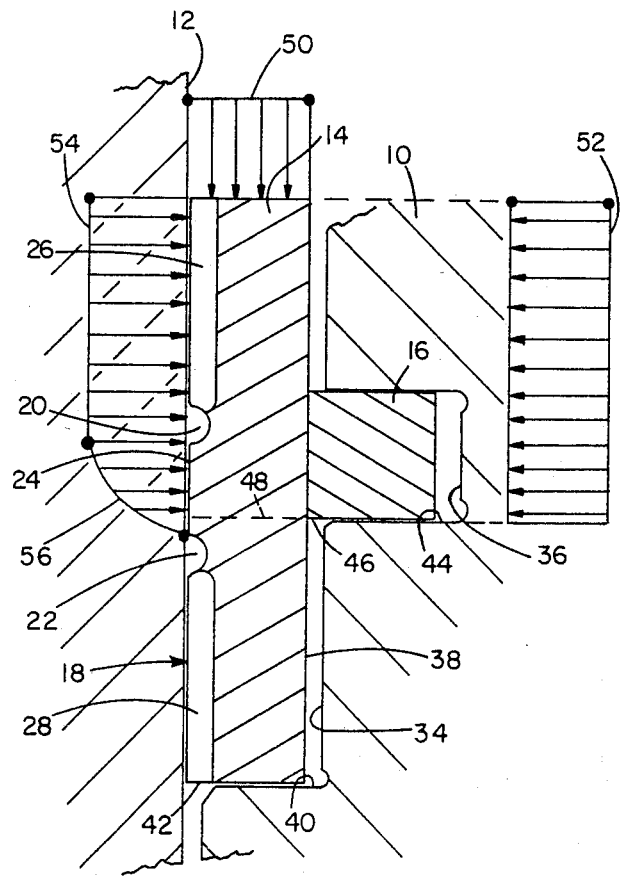
FIG. 4 is a schematic diagram showing pressure profile characteristics of the seal structure of FIGS. 1–3.
Figure 3:
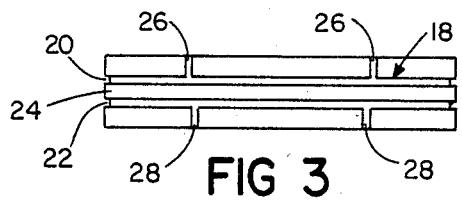
FIG. 3 is a side view of the seal structure employed in the system of FIG. 1.

With reference to FIG. 1, there is shown piston 10 that is housed within cylinder 12 and that carries a seal assembly including band ring 14 and backup ring 16. Formed in the outer face 18 of band ring 14 are two circumferential pressure distribution or equalizing grooves 20, 22 spaced about 0.1 inch apart with an annular seal surface 24 defined therebetween, together with a series of axially extending gas bleed grooves 26, 28 (FIG. 3) that extend from each pressure distribution groove to the adjacent end face of band ring 14. The band and backup seal components incorporate appropriate joint constructions 30, 32 (FIG. 2), such as lap, double lap or step cut joints, depending on the particular application. Band ring 14 is disposed in recess 34 in piston 10, and backup ring 16 is disposed in supplemental recess 36 in recess 34 and seated on the smooth inner surface 38 of ring 14. With reference to FIG. 4, recess 34 has a lower surface 40 against which the low pressure end 42 of band ring 14 seats, and supplemental recess 36 has a similar lower surface 44 against which the low pressure surface 46 of backup ring seats such that an extension of surface 46 (as indicated by line 48 in FIG. 4) is located between the two pressure distribution grooves 20, 22. In cases where the cylinder bore is tapered, usually resulting from wear or thermal distortion, ring sticking and wear in the piston grooves 34, 36 may be reduced by use of a tapered bottom face on the band component 14 and a tapered and presssure-relieved bottom face on backup component 16, or a flexible spacer ring may be disposed in groove 34 below the band.

With reference to FIG. 4, the narrow annulus 24 in the middle of surface 18 of band ring 14 is in sliding contact with the wall of cylinder 12 and the backup ring 16 is in static contact with surface 38 of band ring 14 and located roughly in the middle of the band ring 14 with portions of the band ring extending above and below the backup ring 16 in the sliding seal direction. The total area of the sliding face 18 of band ring 14 is much greater than the intermediate seal area 24 between the pressure equalizer grooves 20, 22 and spreads the force reactions and the residual ring rolling moment over a large area and provides control of distortion and wear of the assembly.

With further reference to the diagram of FIG. 4, the pressure above piston 10 applies a downward pressure as indicated by profile 50, which seats the band ring 14 on recess surface 40 and seats the backup ring 16 on recess surface 44, while pressure is applied uniformly as indicated by pressure profile 52 to the rear surfaces of the band ring and backup ring down to the interface between backup ring 16 and its recess 32. Pressure bleed grooves 26 transmit the high pressure above piston 10 to pressure distribution groove 20 as indicated by profile 54 and pressure bleed grooves 28 transmit the low pressure below piston 10 to pressure distribution groove 22. A transition pressure profile 56 which is typically parabolic shaped in the case of gas and straight in the case of liquid exists across the seal annulus 24 between the pressure distribution grooves 20, 22. The seat surface 44 of annulur cavity 36 locates the bottom edge 46 of backup ring 16 relative to seal region 24, and the pressure force on the rear of backup ring 16, which is transmitted through the band ring 14 to the seal interface 24, is of magnitude adequate to compensate for the pressure profile 56 and to obtain a low but adequate sliding contact sealing force. Backup ring 16 is free to slide on the rear surface of band ring 14, providing compensation for thermal expansion or other factors, as well as ability to use different materials and simplicity of manufacture of the seal system components.

As indicated in FIG. 4, flow restriction and variation in pressure profile occurs across the narrow seal surface annulus 24 in the middle of the sliding face 18 of band ring 14 between the pressure distribution grooves 20, 22, although the possible contact force on the cylinder are distributed across the entire band surface 18. For the seal to be stable and have low leakage, the sliding clearance is desirably very small, of the order of typical surface roughness or fabrication tolerances. With pressure ratios typical of engines and gas compressors or expanders, the pressure drop across the seal annulus may involve four phenomena: static pressure reduction to accelerate the leakage flow across the gap ('nozzle' effect), pressure drop to overcome friction during through flow, pressure drop to accelerate the gas as it expands during through flow, and limitation of pressure decay in the gap due to sonic velocity at the gap discharge ('choking'). If the bottom face 46 of backup ring 16 is positioned behind the band sealing annulus 24 between the pressure distribution grooves 20, 22 at an axial position that is about 73% (towards downstream) of that annulus span, then the instantaneous cylinder pressure force behind the backup ring will just balance the instantaneous maximum film pressure force that could occur if the gap were to open slightly. Such backup force should keep the band ring in close rubbing contact with the cylinder wall, in which case the average film pressure is only 67% of the cylinder pressure (indicated by the pressure profile 50), and the net rubbing contact force is 6% of the cylinder pressure. As the friction of rings 14, 16 on their bottom faces 42, 46 makes it difficult to balance the band and backup forces so closely, it is desirable that the transmitted backup force be slightly greater than the force of the pressure profile across the sealing annulus.

In a particular embodiment, the diameter of diesel piston 10 is three and one half inches, and the pressure differential across the piston is 1,000 psi; the band ring 14 is of spring steel and has a height of about 0.5 inch and a thickness of about 0.1 inch; the backup ring 16 is of spring steel and is substantially square in cross section and about 0.1 inch on a side; the width of the seal annulus 24 (the space between the pressure distribution grooves 20, 22) is 0.1 inch, and a seal contact pressure of about 120 psi is provided. Thus, the net contact pressure is a small fraction of the applied gas pressure.

Figure 6:
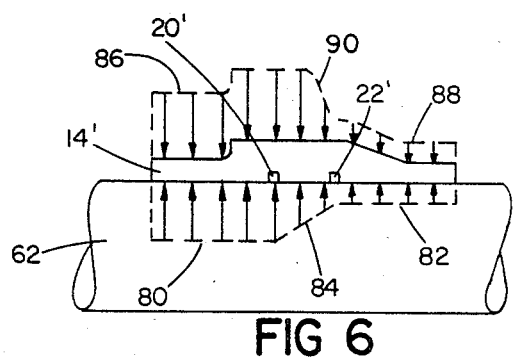
FIG. 6 is a pressure profile diagram of the seal system shown in FIG. 5.
Figure 5:
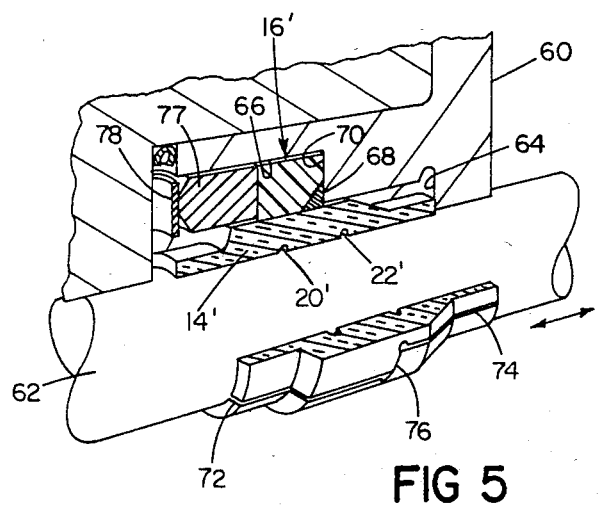
FIG. 5 is a perspective view of a second seal structure in accordance with the invention.

The embodiment shown in FIGS. 5 and 6 is an application of the pressure compensated seal system to an intensifier system for sealing abrasive drilling mud at a temperature of several hundred degrees Fahrenheit and pressures of 15,000 psi in a geothermal well drilling system. The seal system includes housing 60 through which ceramic (silicon carbide) plunger shaft 62 extends and defines a cavity 64 in which a seal assembly is disposed. That seal assembly includes sealing band 14' which surrounds plunger shaft 62 and is also made of hard wear-resistant material (silicon carbide or a cermet such as Ferrotic TM (titanium carbide particles in a steel matrix)), and a composite static seal 16' of Teflon TM seal ring 66 and bronze anti-extrusion ring 68 that is disposed in supplemental cavity 70. Seal band 14' has pressure equalization grooves 20', 22' and the Teflon seal 66 and bronze ring 68 are located axially in backup relation to the seal region between grooves 20', 22'. Seal band 14' has two longitudinal joints 72, 74 which are offset from one another and which are joined by circumferential split 70 (that provides a seal between longitudinal joints 72, 74) so that the band 14' is radially compliant and can exert compressive radial pressure on shaft 62, depending on the pressure applied to its outer surface. Spacer 77 and wave spring 78 provide an axial pre-load on static seal 16'.

The radial pressure profiles on the inner and outer surfaces of seal band 14' are shown in FIG. 6. High pressure is transmitted along longitudinal split 72 to the groove 20' as indicated by profile 80; and low pressure is transmitted along longitudinal split 68 to the second groove 22' as indicated by profile 82. Between the grooves, an essentially linear pressure profile 84 exists, the linear drop occurring because clearance between shaft 62 and band 14' is very small (on the order of the surface roughness) and the leakage flow is controlled by fluid viscosity not inertia.

High pressure is also transmitted along the outside of sealing band 14' up to the high pressure side of the static seal 16' as indicated by profile 86 while low pressure is similarly transmitted up to the low pressure side of backup ring 16' as indicated by profile 88. A transition region indicated by profile 90 is selected in location by the position of static seal 16' to provide a radially inwardly directed seal force on the region between the grooves 20', 22'.

The distance between the grooves 20', 22' is chosen to provide a desired extent of annular seal area; while the axial length of band 14' is selected to provide adequate stability of the band member 14'. Band 14' is always pressed lightly against shaft 62 so that no 'daylight' gap is found between shaft 62 and band 14'. Due to the low value of bearing pressure, friction and wear are minimized. Band 14' will compensate for wear automatically by closing itself around the plunger shaft 62 (in reducing the width of longitudinal splits 68, 70) to maintain the original contact pressure.

While particular embodiments of the invention have been shown and described, various modifications will be apparent to those skilled in the art, and therefore it is not intended that the invention be limited to the disclosed embodiments or to details thereof, and departures may be made therefrom within the spirit and scope of the invention.

What is claimed is:

1. Seal structure for positioning between two members disposed for sliding relative movement comprising a band component that is adapted to be carried by one member and that has a front surface for engagement with the other member, two pressure distribution regions formed in said front surface of the band component, and a seal surface between said two pressure distribution grooves, and a backup component seated on a rear surface of said band component in general alignment with said seal surface, said backup component being free to slide on said rear surface of said band component in a direction generally perpendicular to the disposition of said pressure distribution regions and providing pressure compensation at said seal interface.

2. The seal structure of claim 1 wherein the total area of said front surface of said band component is at least three times the area of said seal surface between said regions.

3. The seal structure of claim 1 wherein said band and backup components are ring members.

4. The seal structure of claim 3 wherein said backup component is disposed outside of said band component.

5. The seal structure of claim 3 wherein said backup component is disposed inside said band component.

6. The seal structure of claim 1 wherein the low pressure side of said backup component is located between said two regions.

7. The seal structure of claim 1 wherein said pressure distribution regions are defined by grooves in said front surface, said seal surface between said grooves is of annular configuration and the total area of said front surface of said band component is at least three times the area of said annular seal surface.

8. The seal structure of claim 1 wherein each of said two members is of cylindrical configuration and said two members are disposed for axial sliding movement relative to one another, said one member includes a recess in which said band component is disposed and a supplemental cavity in said recess in which said backup component is disposed, said supplemental cavity positioning said backup component in general alignment with said seal surface while allowing said backup component to slide along said rear surface of said band component in a direction generally perpendicular to the disposition of said pressure distribution regions.

9. The seal structure of claim 8 wherein said one member is a piston and said other member is a cylinder in which said piston is disposed for axial movement.

10. The seal structure of claim 8 wherein said one member is a housing and said other member is a shaft disposed for axial movement in said housing.

11. The seal structure of claim 8 wherein said band and backup components are ring members, each said pressure distribution region is an essentially continuous groove and said pressure distribution grooves are disposed generally parallel to one another so that a circumferential seal surface is defined between said grooves.

12. The seal structure of claim 11 wherein said recess and said supplemental cavity position said band component and said backup component so that the low pressure side of said backup component is located between said two grooves.

13. The seal structure of claim 11 and further including pressure bleed channel means extending from the high pressure side and the low pressure side of the band component to each said groove adjacent said high pressure side and said low pressure side respectively.

14. The seal structure of claim 13 wherein said backup component is of rectangular cross-sectional configuration and the axial length of said front surface of said band component is at least three times the axial length of said backup component.

15. The seal structure of claim 14 wherein the total area of said front surface of said band component is at least three times the area of said circumferential seal surface.

* * * * *